Dec. 1, 1942.   W. G. SHIPMAN   2,304,028
TRUCK BODY CONSTRUCTION
Filed Dec. 5, 1939

INVENTOR.
Walter G. Shipman
BY
J. Preston Swecker
ATTORNEY.

Patented Dec. 1, 1942

2,304,028

UNITED STATES PATENT OFFICE 2,304,028

TRUCK BODY CONSTRUCTION

Walter G. Shipman, Iowa Park, Tex.

Application December 5, 1939, Serial No. 307,713

2 Claims. (Cl. 214—84)

This invention relates to improvements in truck bodies of the type having provision for power loading or unloading thereof by the provision of attachments to the body that may be used to assist in loading and at the same time form unitary parts of the truck body in such manner that said attachments do not in any way interfere with the load which is carried by the body.

Various attempts have been made to provide truck bodies with gin poles and rollers but their faults were such that they have not met with the entire approval of the users of such trucks in general. Gin poles as usually provided are so positioned above the truck body at the sides thereof as to prevent a wide load from resting securely on the truck bed. Also rollers have usually been mounted permanently on the truck body with no provision for removal and replacement should they become worn or otherwise damaged.

The present invention has for its object to obviate these objections by making the gin poles rest within recesses along the truck body in such manner that they will be level with the truck bed and thus form a usable extension to the width of the truck bed.

The roller is preferably made in three removable parts, the two end portions of which may be readily removed by the removal of a pin, and the center section of which may be removed from the frame by the removal of two bearing caps. The roller is mounted slightly above the surface of the truck bed so as to prevent objects being loaded from immediately becoming friction bound by engagement with the bed. The two end sections of the roller are particularly desirable in loading wide objects that are usually on skids, and of a width substantially the same as that of the truck body. When it is desired to remove these end sections, however, and to swing the gin poles to a substantially rearward horizontal position this may be easily done.

When it is necessary to use a snatch block or other auxiliary loading block, a disappearing linkage is provided that does not interfere with the smoothness of the truck bed when it is in disappearing position.

A preferred embodiment of this invention is illustrated in the accompanying drawing, in which.

Figure 1:
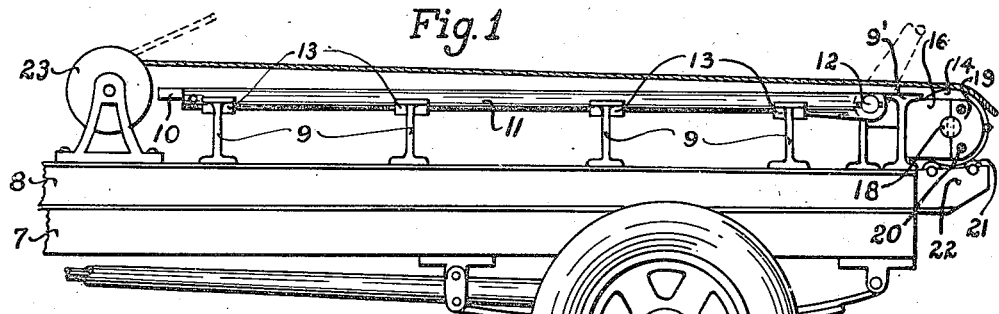
Fig. 1 is a side elevation of the rear portion of a truck with the invention applied thereto, having the outer section of the roller removed to show the details of the roller mounting.
Figures 2, 3:
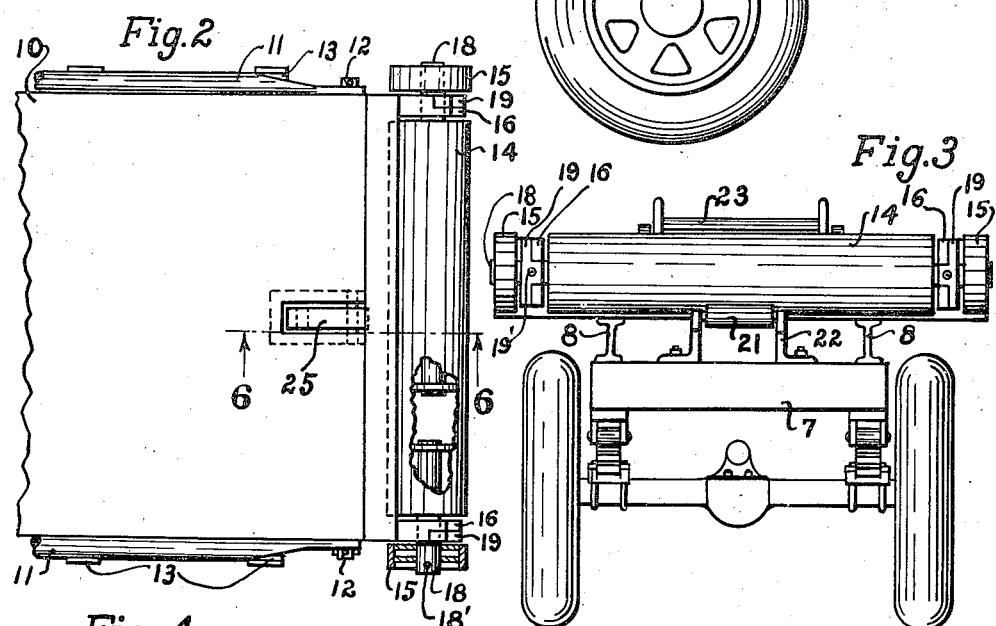
Fig. 2 is a fragmentary top plan view of the rear portion of the truck with parts broken away and parts in section.
Fig. 3 is a rear elevation of the truck showing the invention applied thereto.

With more detailed reference to the drawing, the numeral 7 designates a conventional truck body chassis having a frame 8 carrying transverse members 9 to which is secured the usual truck platform 10. Directly on each side of the platform 10 is mounted a gin pole 11 which is mounted at one end upon a pivot 12, and these poles 11 are arranged in positions to rest in depressions or sockets 13 formed in the upper sides of the outer ends of transverse members 9. When at rest, these gin poles are in such positions as to be on the level with the truck bed with their upper edges substantially flush therewith, as shown in Figs. 1 and 2.

Figure 4:
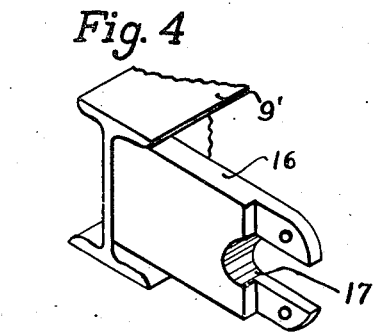
Fig. 4 is a fragmentary detail view in perspective of the roller mounting with the roller and bearing cap removed.
Figure 5:
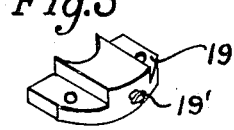
Fig. 5 is a perspective view of a bearing cap that interfits with the roller mounting.

A roller 14, having removable end roller sections 15, is mounted on stub shafts 18 journaled in rear frame extension members 16 attached to transverse member 9', as shown in Fig. 4, and each member 16 has an open end 17 therein to permit the removal and replacement of shafts 18. The roller sections 15 are journaled on the outer ends of the stub shafts 18 where they are held in place by pins 18' that are removable to permit the removal of the end roller sections 15 when necessary. A bearing cap 19 (Fig. 5) is provided to interfit around the shaft 18 and close the opening 17. The bearing cap 19 is preferably attached with counter-sunk head cap screws 20. The bearing cap 19 is also provided with a suitable lubricating fitting 19'. The center of the roller 14 is supported by a pair of auxiliary rolls 21 which are mounted on brackets 22 removably secured to the truck chassis.

Figure 6:
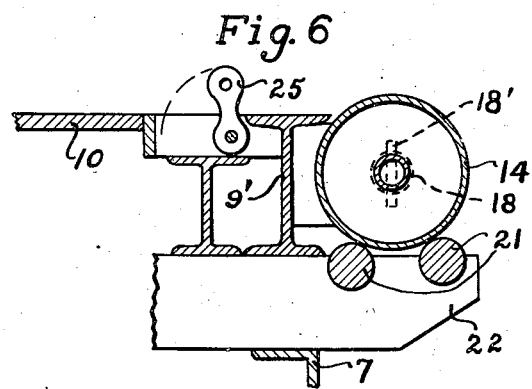
Fig. 6 is a transverse section on the line 6—6 of Fig. 2 showing the disappearing linkage and roller.

A winch 23 is usually mounted on the truck chassis for the purpose of loading and unloading heavy objects. A cable 24 is shown as passing rearwardly over the truck platform 10 clearing the same and over roller 14 to provide for loading heavy objects onto the truck or the cable may pass over the top of the gin poles when the latter are raised to upright positions as shown in dotted outline in Fig. 1, for lifting or loading purposes. To employ a snatch block in connection with loading, it is only necessary to raise snatch block link 25 pivoted in the platform 10, as shown in Fig. 6, and attach the snatch block thereto, which obviates the necessity of using chains and other unnecessary equipment in securing the loading blocks.

The arrangement of the roller sections 15, substantially in the vertical longitudinal planes of the gin poles 11 and on opposite sides of the bearings 17 facilitates the loading of heavy poles and other articles on the truck bed without interference, keeping such articles off the gin poles, and this is especially true when the gin poles are used in horizontal positions. The arrangement of the gin poles with their upper edges substantially flush with the upper surface of the bed, prevents interference with the corners of the bed, and in fact forms an extended bed, inasmuch as these gin poles are rigidly supported.

I claim:

1. In a truck body, the combination of a chassis having a platform with a top supporting surface, bearings supported by the chassis substantially within the lateral confines of the platform at the rear end thereof, a roller having end shaft portions journaled in said bearings, and auxiliary rollers laterally externally of the bearings and carried wholly by the end shaft portions and journaled thereon for freedom of relative turning movement with the lateral sides of the rollers exposed to receive lading thereon, said first-mentioned and auxiliary rollers being mounted in axial alignment and with the upper surfaces thereof substantially in horizontal alignment with the platform top supporting surface.

2. In a truck body, the combination of a chassis having a platform with a top supporting surface, bearings supported by the chassis substantially within the lateral confines of the platform at the rear end thereof, a roller having end shaft portions journaled in said bearings, and auxiliary rollers laterally externally of the bearings and carried wholly by the end shaft portions with the lateral sides of the rollers exposed to receive lading thereon and disposed laterally externally of the side edges of the platform, said auxiliary rollers being journaled for relative turning movement, said first-mentioned and auxiliary rollers being mounted in axial alignment and with the upper surfaces thereof substantially in horizontal alignment with the platform top supporting surface, each of said bearings having the top and rearward peripheries thereof within the confines of the adjacent auxiliary roller.

WALTER G. SHIPMAN.